United States Patent
Devanagondi et al.

(10) Patent No.: US 7,317,730 B1
(45) Date of Patent: Jan. 8, 2008

(54) QUEUEING ARCHITECTURE AND LOAD BALANCING FOR PARALLEL PACKET PROCESSING IN COMMUNICATION NETWORKS

(75) Inventors: Harish Devanagondi, Saratoga, CA (US); Nicholas Bambos, San Matoo, CA (US); Harish Belur, Saratoga, CA (US); Richard Heaton, San Jose, CA (US); Majid Torabi, Los Altos Hills, CA (US)

(73) Assignee: Greenfield Networks, Inc., Santa Clara, CA (US)

( * ) Notice: Subject to any disclaimer, the term of this patent is extended or adjusted under 35 U.S.C. 154(b) by 930 days.

(21) Appl. No.: 10/269,414

(22) Filed: Oct. 11, 2002

Related U.S. Application Data

(60) Provisional application No. 60/329,425, filed on Oct. 13, 2001.

(51) Int. Cl.
H04L 12/28 (2006.01)
H04L 12/54 (2006.01)
(52) U.S. Cl. ..................... 370/412; 370/429
(58) Field of Classification Search ............... 370/389, 370/391, 412–419, 428, 429, 473, 474
See application file for complete search history.

(56) References Cited

U.S. PATENT DOCUMENTS

| | | | | |
|---|---|---|---|---|
| 5,757,771 A * | 5/1998 | Li et al. | | 370/235 |
| 5,905,725 A | 5/1999 | Sindhu et al. | | |
| 6,072,772 A * | 6/2000 | Charny et al. | | 370/229 |
| 6,160,819 A | 12/2000 | Partridge et al. | | |
| 6,324,165 B1 * | 11/2001 | Fan et al. | | 370/232 |
| 6,424,621 B1 * | 7/2002 | Ramaswamy et al. | | 370/230 |
| 6,539,025 B1 * | 3/2003 | Manning et al. | | 370/414 |
| 6,650,641 B1 * | 11/2003 | Albert et al. | | 370/392 |
| 6,907,001 B1 * | 6/2005 | Nakayama et al. | | 370/230 |
| 7,016,367 B1 * | 3/2006 | Dyckerhoff et al. | | 370/429 |
| 2001/0023469 A1 * | 9/2001 | Jeong et al. | | 710/241 |
| 2002/0136230 A1 * | 9/2002 | Dell et al. | | 370/416 |
| 2002/0176431 A1 * | 11/2002 | Golla et al. | | 370/412 |
| 2005/0018682 A1 * | 1/2005 | Ferguson et al. | | 370/392 |

OTHER PUBLICATIONS

Bennett, Jon C. R., "Packet Reordering is Not Pathological Network Behavior," Dec. 1999, pp. 789-798, vol. 7, No. 6, IEEE/ACM Transactions on Networking.

Adiseshu, Hari, Parulkar, Guru and Varghese, George, "A Reliable and Scalable Striping Protocol," 11 pages, Department of Computer Science, Washington University, St. Louis, MO, "The referenced paper is to appear in *Computer Communication Review*, a publication of ACM SIGCOMM, vol. 26, No. 4, Oct. 1996. ISSN #0146-4833," according to ACM SIGCOMM '96 paper retrieval site, Retrieved from the Internet Jan. 15, 2003 <http://www.acm.org/sigcomm/sigcomm96/papers/adiseshu.html>, attached.

(Continued)

*Primary Examiner*—Wing Chan
*Assistant Examiner*—Hong Sol Cho
(74) *Attorney, Agent, or Firm*—Needle & Rosenberg, P.C.

(57) ABSTRACT

A parallel packet processing queueing architecture and method are described. A packet is divided up into cells. A first or start processor queue is selected for the first cell. The following cells of the packet are then placed in the queues in a predetermined order. An example of a predetermined order is placing the cells in consecutive processor queues modulo (the number of processor queues) after the start processor. Such a predetermined order is illustrated in the context of a per Cell Contiguous Queueing (CCQ) architecture. The architecture provides benefits of alleviating the pre-processing and post-processing buffering burdens and decreasing the amount of information required for reassembly of the packet.

20 Claims, 4 Drawing Sheets

OTHER PUBLICATIONS

Shreedhar, M., Varghese, G., "Efficient Fair Queuing Using Deficit Round Robin", pp. 231-242, SIGCOMM '95, Cambridge, MA, U.S.A.

D. Shah and P. Gupta, "Fast incremental updates on Ternary-CAMs for routing lookups and packet classification," in Proc. of Hot Interconnects-8, Stanford, CA, USA, Aug. 2000.

* cited by examiner

QUEUEING ARCHITECTURE AND LOAD BALANCING FOR PARALLEL PACKET PROCESSING IN COMMUNICATION NETWORKS

CROSS-RELATED APPLICATION

This application claims priority under 35 U.S.C. § 119(e) to U.S. provisional patent application, "Queuing Architecture and Load Balancing Method for Parallel Packet Processing in Communication Networks," having a Ser. No. 60/329,425 and a filing date Oct. 13, 2001. The subject matter of the foregoing is incorporated herein by reference in its entirety.

BACKGROUND

Field of the Invention

This invention relates to the field of parallel packet processing in communication networks.

As communication networks scale up in terms of speed and capacity, packets being switched and routed through network nodes need to be processed at increasingly higher speeds, matching those of the communication network links. Additionally, the processing per packet is becoming more complex. The processing involves not only determining the destination of the packet but the processing of security parameters of the packet. As a result, parallel packet processing architectures are recently receiving increased attention by the network engineering community, promising to deliver the performance needed for next generation high-speed networking.

A rather straight-forward parallel packet processor architecture is based on redirecting each incoming packet on the ingress line or ingress port to one of several packet processors, which is typically selected according to some appropriate load balancing algorithm. The processor processes the packet header and prepares the packet for forwarding to an egress node port. Packets are of various byte-lengths, that is, they are comprised of an arbitrary number of information bits. Each processor is equipped with an input buffer, into which each packet allocated to this processor is fully queued up, while waiting to be processed. Assuming the ingress line rate operates at rate R bits/sec and there are K processors, we see that each processor should at least be draining its buffer at rate R/K bits/sec, in order to keep the flow balance. A characteristic feature of this architecture is that each packet is fully queued up in the buffer of a single processor, that is, the one to which it is assigned. Therefore, it is referred to as a per-Packet-Queuing (PQ) architecture. However, in the PQ case, the minimum buffer size required is the number of bits in a maximum sized packet.

An important issue in every parallel and distributed processing architecture is that of load balancing. The objectives in load balancing include the following. One objective is given that each processor queue has finite capacity, a proper load-balancing scheme prevents processor queues from filling up and overflowing, which would result in bits being dropped. Moreover, another objective of load balancing is to prevent queues from going empty under maximum ingress load, hence, to prevent processors from being starved and creating a processing deficit or lost processing bandwidth. Finally, another objective of load balancing is to minimize the bit-count fluctuation in the processor queues, hence, to really minimize the size of queue buffers required to achieve the previous two objectives.

Another important consideration in parallel packet processing architectures for networking equipment is the maintenance of packet ordering typically indicated in a packet identifier. The networking device is expected to transmit packets in the same order in which they are received. If different packets (or fragments of packets) are sent to different parallel engines, some additional logic and processing is required to make sure that the packets are collected from the parallel engines and forwarded in the order in which they were received. It is clear in the PQ case that the amount of buffering required after the processing engines is the same as the maximum packet size. Additionally, since a packet at a time is sent to the processors the amount of buffering required after the processors is K times the maximum packet size.

One may also consider the case where a packet is split into several cells and each of those is enqueued in the processor queues by scattering in various queues in an arbitrary manner satisfying other considerations. Such architectures are called per-Cell-Scattered-Queueing ones (CSQ). With a scattered cell placement of packet cells in the processor queues, a large amount of information needs to be communicated to the post-processing engine (packet assembler) in order to put the packet back together from its constituent cells.

Both of these architectures require significant pre-processing buffering, post-processing buffering, and information required for packet reassembly. It is desired to provide a queueing architecture that reduces the burden on buffering and the amount of information needed for reassembly.

SUMMARY OF INVENTION

The present invention may be embodied in a method for placing cells of a packet in processor queues according to a predetermined order in a parallel packet processing system. The method comprises selecting a first processor queue for the first cell of the packet, and enqueueing each nth cell in a processor queue in accordance with a predetermined order beginning with the first processor queue.

The present invention may also be embodied in a parallel packet processing system for placing cells of a packet in processor queues according to a predetermined order. The system comprises a plurality of processor queues and a cell scheduler for selecting a first processor queue for the first cell of the packet, and a cell switch being in communication with the cell scheduler. The cell scheduler comprises logic which may be embodied in hardware (e.g. optical or electrical), software, firmware or a combination of these, for selecting a first processor queue for the first cell of the packet. The cell switch has access to the plurality of processor queues, and the cell switch receives instructions from the cell scheduler for enqueueing each nth cell in a processor queue in accordance with a predetermined order beginning with the first processor queue.

The system may also further comprise a cell assembly manager that is communicatively coupled with the cell scheduler for receiving data indicating the first queue. Once the cell assembly manager has the first queue or the queue with the first cell of the packet, the manager retrieves the remaining cells of the packet in accordance with the predetermined order, and assembles the cells of the packet into packet form again.

In one embodiment of the present invention, the parallel packet processing system has a queuing architecture that is referred to as a per-Cell-Contiguous-Queuing architecture or CCQ architecture because of the way it distributes the packet to the processor queues. First, the first or start or starting queue into which to enqueue the first or head cell of the packet is chosen or selected. The following cells are then enqueued according to a predetermined order of placing them in consecutive processor queues after the first queue holding the first cell, where each cell is forwarded to the next queue (for example in increasing order of queue index modulo K), given the queue in which the previous cell was placed.

The present invention provides benefits with respect to pre-processing buffering, post-processing buffering, and the amount of information required for reassembly of the packet as will be further illustrated below.

DETAILED DESCRIPTION

It is understood by those of ordinary skill in the art that the various embodiments of the systems and methods of the invention may be embodied in hardware, software, firmware or any combination of these, and that the software, hardware (e.g. optical or electrical), firmware or combination may be embodied in a computer usable medium. An example of a computer usable medium is a memory. Additionally, those skilled in the art will appreciate that although modules or functional blocks may be depicted as individual units, the functionality of the modules or blocks may be implemented in a single unit or any combination of units.

Figure 1:
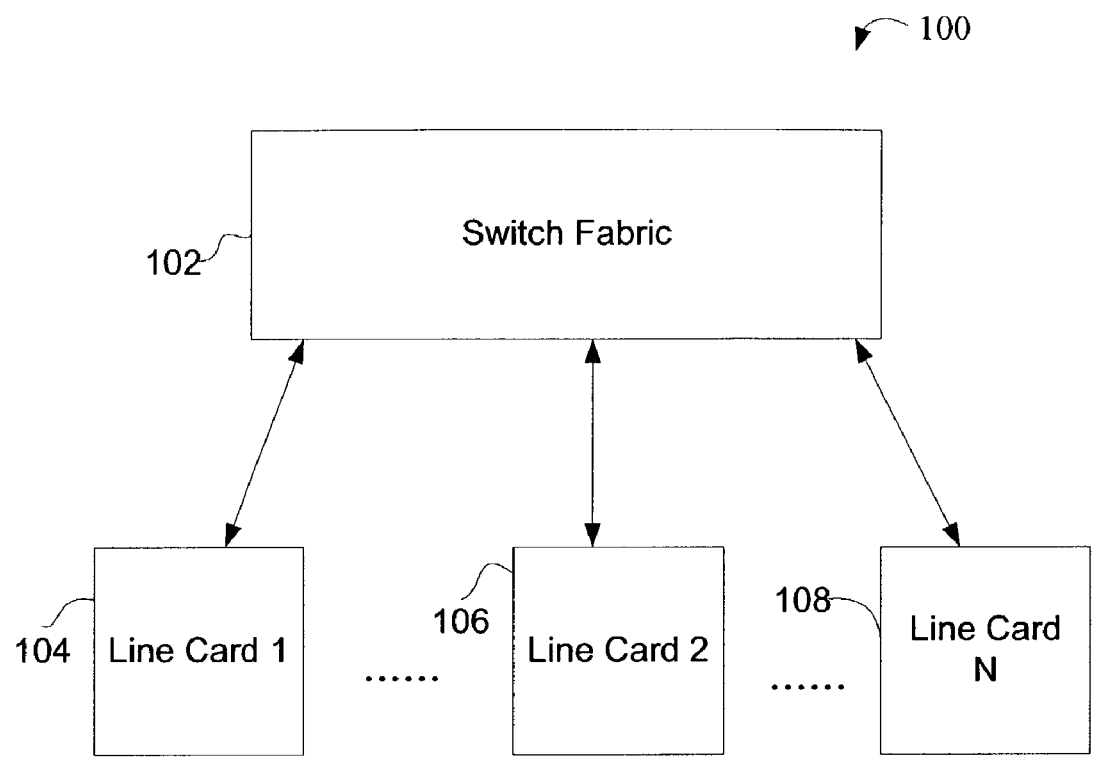
FIG. 1 illustrates an architecture of a packet processing engine in accordance with an embodiment of the present invention.

FIG. 1 illustrates an architecture of a packet processing engine 100 in accordance with an embodiment of the present invention. The engine comprises a switch fabric 102 and a plurality of line cards 104, 106, 108. The line cards process packets received over a network and from the switch fabric and forwards packets to the switch fabric or a network interface for routing to their proper destinations.

Figure 2:
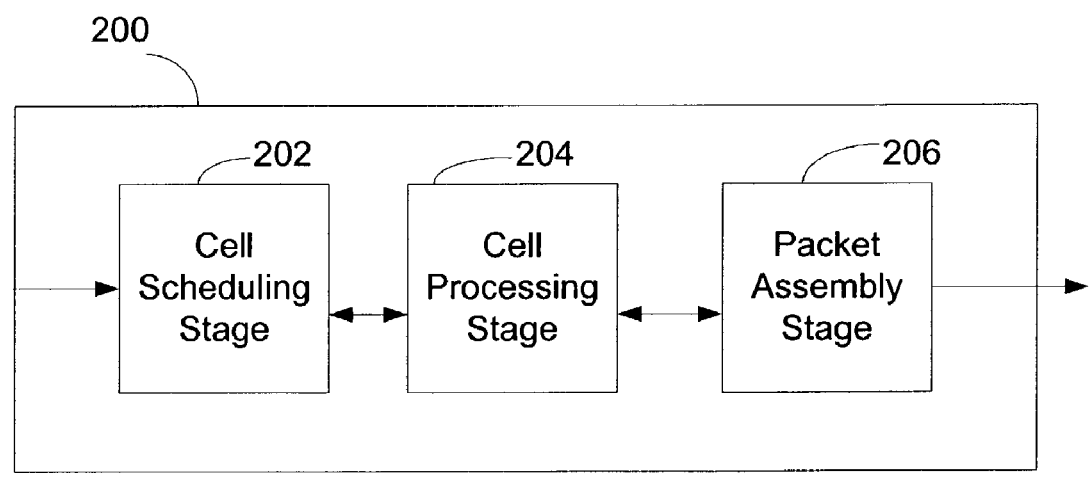
FIG. 2 illustrates functional units of a packet processing engine in accordance with an embodiment of the present invention.

FIG. 2 illustrates functional units 200 of a packet processing engine in accordance with an embodiment of the present invention. In the embodiment of FIG. 1, these functional stages may be implemented in logic and storage blocks on one or more of the line cards illustrated in FIG. 1. This engine divides the packet into cells and processes the cells which are reassembled back into the packet. A packet is received by the cell scheduling stage 202 which selects a queue for each cell of the packet in accordance with a CCQ architecture. The cell processing functional stage 204 processes the cells, and the packet assembly stage 206 reassembles the cells back into packets.

Figure 3:
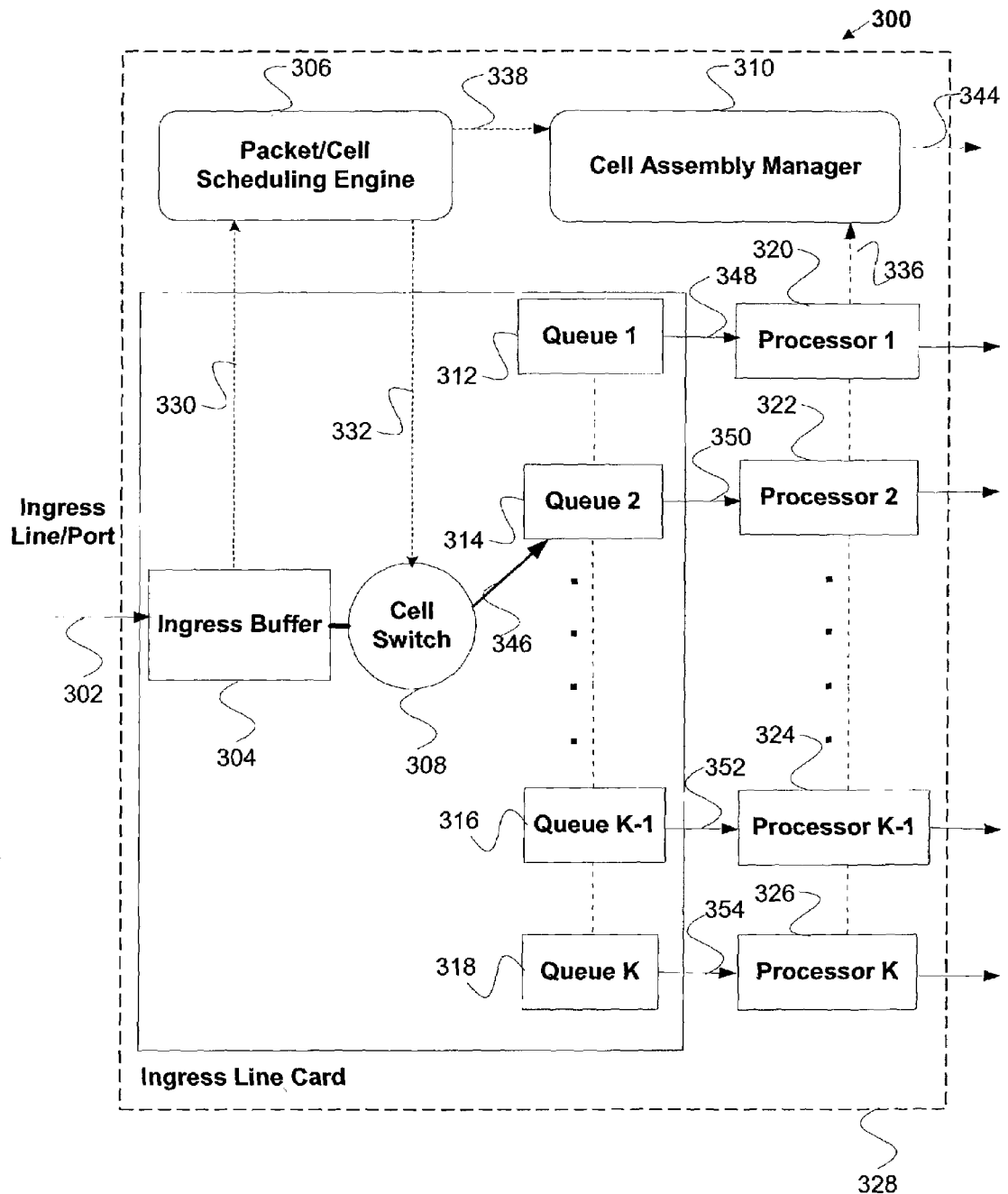
FIG. 3 illustrates a CCQ system comprising functional blocks in accordance with an embodiment of the present invention.

FIG. 3 illustrates a CCQ system 300 comprising functional blocks in accordance with an embodiment of the present invention. The system 300 comprises an ingress buffer 304 having an ingress line or ingress port 302, a cell switch 308, a packet/cell scheduling engine or cell scheduler 306, a cell assembly manager 310, a number of processor queues 312, 314, 316, 318 and a number of processors 320, 322, 324, 326. The processor queues may be indexed beginning with either a "0" or a "1". Also, the processor queues 312, 314, 316, 318 maybe different sizes or the same size. The processors 320, 322, 324, 326 typically examine the headers associated with the packets to check one or more fields such as source, destination, checksum and Time to Live (TTL). Typically, the processors operate at the same speed, but they may operate at different speeds also. The solid line vectors 346, 348, 350, 352, 354 demonstrate the flow of bits through the system. The dashed line vectors 330 332 demonstrate the flow of information exchanged between various functional blocks and the packet/cell scheduling engine 306. For example, information flow 330 from the ingress buffer to the packet/cell scheduling engine comprises an indicator of the arrival of a new packet and a length of the new packet. The information flow 332 from the packet/cell scheduling engine 306 to the cell switch 308 comprises a packet identifier, a header, and a selected queue for placement of a cell. The dashed line vector 338 indicates an information flow from the scheduling engine 306 to the cell assembly manager 310 comprising the information exchanged in flows 330 and 332. The dot-dashed line vectors 336, 344 demonstrate information flows between the various blocks and the cell assembly manager 310. Information flow 336 comprises results of packet header processing such as the source and destination of the packet. Examples of information that information flow 344 typically comprises are the destination decision, the packet identifier and the length of the packet. Of course, those of skill in the art should understand that the flow of information may be bi-directional. In the illustrated example, the functional blocks operate on an ingress line card 328.

The ingress line or ingress port 302 operates at rate R bits/sec, therefore, the time-length of a bit (i.e. the bit duration) is simply 1/R seconds. This is the "time quantum" of the system or the duration of the basic time slot. A packet arriving at the ingress port may be first stored in the ingress buffer 304. In one example, the ingress buffer 304 is implemented using memory first in first out (FIFO) chips. Assuming the ingress line rate operates at rate R bits/sec and there are K processors, each processor drains its buffer at minimum rate R/K bits/sec, in order to keep the flow balance. A packet arriving at the ingress port traverses the ingress buffer 304 where the packet is split into cells of equal size of C bits each, except for the last cell, which may have less than C bits in order to match the arbitrary bit count of the packet.

Then the cells are forwarded to the processor queues 312, 314, 316 and 318 by the cell switch 308 as directed by the cell scheduler 306 as discussed below. In one example, the processor queues 312, 314, 316 and 318 are implemented as memory FIFO chips. Also the cell switch 308 may be implemented as a reverse multiplexer for which flow 332 may also act as a selection line. The cell scheduler 306 comprises logic which may be implemented in a variety of ways including in a application specific integrated circuit (ASIC), a programmable logic device (PLD) or a central processing unit (CPU). The cell assembly manager 310 comprises logic also which may be implemented in a variety of ways including these examples as well. The cell assembly manager 310 further comprises an information storage block such as a memory for combining received information and forwarding it to further processing stages (not shown). The cells of the packet may be forwarded to the processor queues in various manners including a store-and-forward manner or directly in a cut-through manner. For purposes of the discussion of the embodiments, cut-though operation is assumed, but the described queueing and load balancing schemes extend naturally to the store-and-forward case as well.

In the embodiment of the invention shown, the packet/cell scheduling engine or cell scheduler 306 exchanges information with the ingress buffer 304 and the cell switch 308. The cell scheduler 306 comprises logic implementing a method of selecting queues for cells of bits for the packet in accordance with the invention. The objective that the scheduler is trying to achieve by selecting the queue in which to place the first cell of a new packet is to load balance the queues and avoid having bits being dropped because of queue overflows during the highest load under normal system operation. A naïve choice for a start or first processor queue may result in large short-term flow imbalances among the processors resulting in the requirement for large pre-processing buffering to prevent packet drops or long term flow imbalances among the processors resulting in the requirement for an infinite amount of pre-processing buffering to prevent packet drops. Once the starting queue is selected, the following cells are distributed in queues in a predetermined order.

The cell scheduler 306 receives 330 information from the ingress buffer and determines when a new packet starts, for example, in which time slot a new packet begins, and when a packet ends. For example, this can be done by examining the header and trailer bit signatures of the packet. The cell scheduler 306 then outputs data 332 including instructions to the cell switch 308 regarding the selection of a queue for a cell of the packet. Additionally, the cell scheduler 306 outputs data 338 to the cell assembly manager 310 indicating in which queues the different cells of each packet in transit reside. The cell assembly manager 310 communicates with the processors 320, 322, 324, 326.

Figure 4:
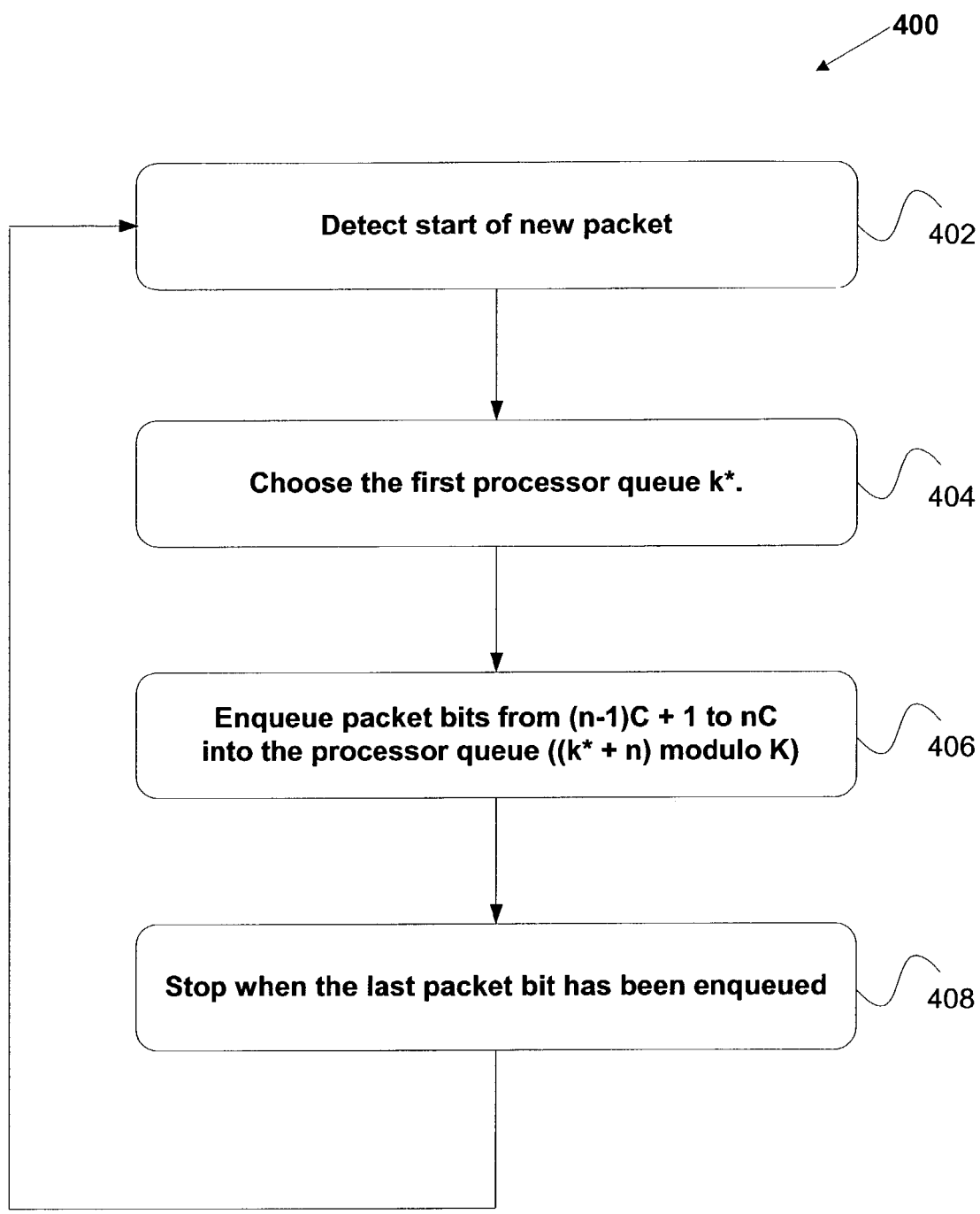
FIG. 4 illustrates an overall method for the placing of cells of a packet in processor queues according to a predetermined order in a CCQ architecture in accordance with an embodiment of the invention.

FIG. 4 illustrates an embodiment of an overall method for the placing of cells of a packet according to a predetermined order in a CCQ architecture in accordance with the invention. This embodiment of the method 400 may be performed by a system such as the system 300 illustrated in FIG. 3. For illustrative purposes only, this embodiment will be discussed in the context of FIG. 3, but those of skill in the art will understand that the method may be performed in other system embodiments as well. Additionally for illustrative purposes only without limiting the invention, in this example, the packet structure and arrival dynamics are assumed to be the following: (1) Each packet is comprised of an arbitrary number of bits, between a minimum bit count (Pmin) and a maximum one (Pmax). (2) Under the highest system load, packets arrive back-to-back, that is, the last bit of a packet is followed by the first bit of the following packet. In general, however, there may be inert or blank time slots between consecutive packets. Again, an objective is that no bits of any packet be dropped because of any queue/buffer overflow during the highest system load under normal operation of the system.

In the embodiment of FIG. 4, a first queue is selected for the first cell, and the following queues are placed in consecutive modulo K queues. In this embodiment, for queue K, queue 1 is the consecutive queue. In modulo arithmetic, N modulo M equals the remainder of N divided by M. For example, assume K, the number of processor queues, equals 36, and the queues are indexed from 0 to 35. For this example, k is a variable representing the number of the current queue, and i represents an index value for queue k. For k=K=36, the index i of queue K is 35. The result of the ((index (i=35) modulo K(36)) is 35. The next consecutive queue, the queue k+1, is determined by incrementing the index value i by 1, N=(i+1) and performing modulo arithmetic where M=K. The consecutive queue k+1 will be the queue (i=0) because (i=35+1=36) modulo (K=36) is 0. In this way, the cells are placed in a wrap around fashion in the queues. In one example, an N bit counter which wraps itself around may be used for tracking the queue index.

Upon detecting 402 the start of a new packet, the cell scheduler 306 selects 404 a processor queue, denoted by k*, and instructs or signals the cell switch 308 to turn to queue k* and start pumping or enqueuing into it the bits of the first cell. When the first C bits, comprising the first packet cell, have been placed into queue k*, the scheduler 306 instructs 406 the cell switch 308 to enqueue the bits from C+1 to 2C comprising the second packet cell into queue (k*+1). Inductively, after the n-th cell comprised of bits (n−1)C+1 to nC has been pumped into queue (k*+n) modulo(K), the scheduler instructs the cell switch to shift to queue (k*+n+1) and pump the C bits of the (n+1)-st cell of the packet into that queue. In this way, the packet bits from (n−1)C+1 to nC are enqueued 406 into the processor queue (k*+n) modulo(K). After the last cell has been enqueued, the cell switch stops 408 queuing of this packet. The method is repeated responsive to the detection 402 of a new packet. This method of cell distribution may be referred to as sequential allocation modulo (K) or CCQ.

In the embodiment of FIG. 4, the order of the queues selected after the first one is predetermined. In FIG. 4, the queues are consecutive modulo (K). However, other predetermined orders may be used so that the queues need not be pumped one right after the other consecutively. For example, other predetermined orderings of the queues after the selection of the first queue based on a formula for the index may be used. An example of such an ordering is placing the following cells in every other queue modulo (K) after the first or start queue.

Figure 5:
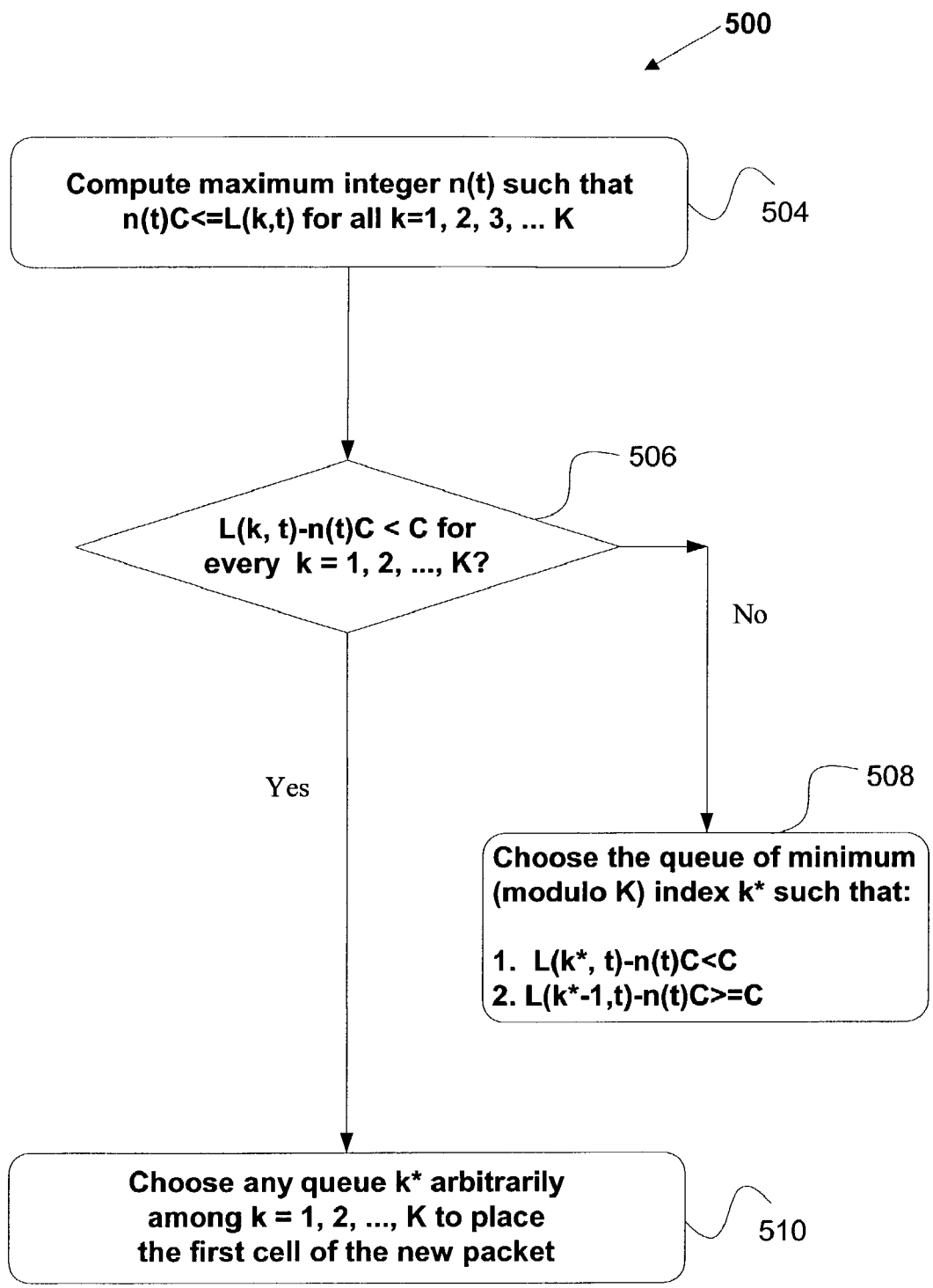
FIG. 5 illustrates a method for selecting a processor queue for a first cell of a packet in accordance with an embodiment of the invention

FIG. 5 illustrates a method for selecting a processor queue for a first cell of a packet in accordance with an embodiment of the present invention. For the illustrative discussion of the embodiment of the method, an explanation of the following parameters is provided. There are K parallel processor channels, indexed by k=1,2,3, . . . K. There are C bits per cell. The maximum packet size is Pmax bits. Packet cells typically are comprised of C bits, except potentially the last one. In the last one, there may be a bit-deficit because the packet length is not necessarily an integer multiple of C. Time is slotted and time slots are indexed by t=1,2,3 . . . A time slot reflects the duration of a bit on the ingress line, which operates at R bits per second. Therefore, the slot duration is 1/R seconds. The load state of a processor queue, $L(k,t)$, is the total number of bits—or load—that has been allocated to processor queue k up to time t (end of time slot t), starting at some initialization time 0. The integer number of cells or the number of full cells for a given cell size of C bits up to time t is $n(t)$ such that the number of cells for the load period is equal to or less than the load state of each processor queue for the load period as represented by $n(t)C = <L(k,t)$ for all k=1, 2, 3, . . . , K.

For the discussion of the embodiment of FIG. 5, assume that in the time slot (t+1) the first bit (and cell) of a new packet is to be placed in a queue according to the method described in FIG. 4. In order to choose the queue, the maximum integer number of full cells in the current load is computed 504 such that the maximum number of full cells is less than the load state of each of the K processors up to time t. This computation may be performed according to n(t)C=<L(k,t) for all k=1, 2, 3, ..., K to obtain an n(t) satisfying this relationship.

A difference between the number of bits in the maximum integer number of cells that have been processed by the system in the load period up to the end of time slot t, n(t), and the bit load for each processor queue for the same load period, L(k,t) is determined 506.

Responsive to all the differences being less than a cell size C, any of the queues may be chosen 510 for placement of the first cell of the packet according to any desired criteria. For example, a queue may be chosen randomly or one may be chosen in accordance with a priority scheme.

Responsive to at least one difference being greater than a cell size C, the queue satisfying the criteria of minimum (index (modulo K)), k*, is chosen 508 such that the following relationships or criteria are satisfied: L(k*,t)−n(t)C<C, and L(k*−1,t)−n(t)C>=C. In other words, the contiguous or consecutive queue of (lowest index (modulo K)) is chosen that comes next consecutively modulo (K) after a previous queue that has more than one cell or more of bits buffered up in its queue waiting to be sent to its processor while this queue has less than a cell size of bits buffered in its queue waiting to be sent to its processor.

The placing of the cells in consecutive modulo (K) processors is an example of a predetermined order of placement which facilitates decreasing the amount of information required for reassembly. Other arbitrarily fixed renumbering placement schemes that are topologically isomorphic may also be used. For example, the predetermined order may be in decreasing order of index modulo K.

Suppose now that at the beginning of time slot T+1 the cells of a new packet start being allocated into the processor queues, following the load balancing/round robin method. The packet is comprised of p bits. Though not essential for the following result, the assumption is made that at the beginning of the first time slot, all processor queues are empty. The following parameters are provided for the discussion below. The * in the arguments of the above quantities represents the generic time slot. Additionally, the discussion focuses on the case in which the cells are placed in sequentially indexed or contiguous queues. However, the proof would apply to other cell queueing schemes having a predetermined order of selection of queues other than the first one.

Lmin(t) is the minimum bit load among all the processor queues. The load state of the system is L(t)=(L(1;t), L(2;t), ..., L(k;t), ..., L(K;t)), that is, the vector of the loads of all its K individual queues. L is the set of all queue load states such that there exists some maximal positive integer n such that nC<=L(k; *)<nC+2C for all processor queues k=1, 2, 3, ... K. Furthermore, there exist a non-empty set of contiguous or sequential (modulo K) queues A(*) and a complementary (potentially empty) set of contiguous or sequential (modulo K) queues B(*), such that their union is the set of all queues and nC<=L(k;*)<nC+C, for each queue k in A(*), and nC+C<=L(k;*)<nC+2C for each queue k in B(*). The following property is then valid, as mathematically proven below:

If L(T) was in L at the end of time slot T, then L(t) will be in L for all t=T+1, T+2, ..., T+p.

Proof: The proof is constructive and proceeds by induction. Assume that L(T) is in L and consider the following cases (and sub-cases). Let n(t) be the reference integer for specifying the first property of the set L in time slot t.

Case I: Let the packet have size p=hC+r, where h<K and r<C, that is, the no processor queue will receive more than C bits of this packet. Consider the following two sub-cases:

Case I.A: Suppose B(T) is non-empty and without any loss of generality assume that A(T)={1, 2, 3, ..., m} and B(T)={m+1, m+2, ..., K} for some m=1, 2, 3, ... K−1. Note that according to the previous definitions, 0<=L(1;T)−Lmin(T)<C, but the queue preceding 1 (modulo K, that is, queue K) has C<=L(K;T)−Lmin(T)<2C. Hence, the load balancing/round robin scheme will place the first cell of the new packet in queue 1.

Then, at time t=aC+b<p with b<C, we have $L(k;t)=L(k;t)+C$, for $k=1, 2, \ldots, a$ $L(k;t)=L(k;t)+b$, for $k=a+1$ $L(k;t)=L(k;t)$, for $k=a+2, a+3, \ldots K$.

Consider now the evolution of the queue loads as the packet cells are placed in the processor queues according to the load balancing/round robin scheme. As a matter of fact, consider the most general case, where a>m, so that packet bits will be place also in queue in B(T). It is shown below that as the packet bits are placed in the queues, the load state L(t) remains in the set L throughout the process.

For time slots t in the interval $T=<t<T+[(n(t)+1)C-L(1;T)]$, $n(t)=n(T), A(t)=A(T)$ and $B(t)=B(T)$, so $L(t)$ is in $L$.

For time slots t in the interval $T+[(n(t)+1)C-L(1;T)]=<t<T+C+[(n(t)+1)C-L(2;T)]$, $n(t)=n(T), A(t)=A(T)-\{1\}$ and $B(t)=B(T)+\{1\}$, so $L(t)$ is in $L$.

For time slots t in the interval $T+C+[(n(t)+1)C-L(2;T]=<t<T+2C+[(n(t)+1)C-L(3;T)]$, $n(t)=n(T), A(t)=A(T)-\{1,2\}$ and $B(t)=B(T)+\{1,2\}$, so $L(t)$ is in $L$.

For time slots t in the interval $T+(l-1)C+[(n(t)+1)C-L(1;T]=<t<T+lC+[(n(t)+1)C-L(l+1;T)]$, with $1<m$, we have $n(t)=n(T), A(t)=A(T)-\{1,2,3,\ldots,1\}$ and $B(t)=B(T)+\{1,2,3,\ldots,1\}$, so $L(t)$ is in $L$.

For time slots t in the interval $T+(m-2)C+[(n(t)+1)C-L(m-1;T]=<t<T+(m-1)C+[(n(t)+1)C-L(m;T)]$, $n(t)=n(T), A(t)=A(T)-\{1,2,3,\ldots,m-1\}$ and $B(t)+B(T)+\{1,2,3,\ldots,m-1\}$, so $L(t)$ is in $L$.

For time slots t in the interval $T+(m-1)C+[(n(t)+1)C-L(m;T]=<t<T+mC$, $n(t)=n(T)+1$, $A(t)=\{1,2,3,\ldots,K\}$ and $B(t)$ is empty, so $L(t)$ is in $L$.

For time slots t in the interval $T+mC=<t<T+mC+[(n(t)+1)C-L(m+1;T)]$, $n(t)=n(T)+1, A(t)=\{1,2,3,\ldots,K\}$ and $B(t)$ is empty, so $L(t)$ is in $L$.

For time slots t in the interval $T+mC+[(n(t)+1)C-L(m+1;T]=<t<T+(m+1)C+[(n(t)+1)C-L(m+2;T)]$, $n(t)=n(T)+1, A(t)=\{1,2,3,\ldots,K\}-\{m+1\}$ and $B(t)=\{m+1\}$, so $L(t)$ is in $L$.

For time slots t in the interval $T+(m+1)C+[(n(t)+1)C-L(m+2;T]=<t<T+(m+2)C+[(n(t)+1)C-L(m+3;T)]$, $n(t)=n(T)+1, A(t)=\{1,2,3,\ldots,K\}-\{m+1,m+2\}$ and $B(t)=\{m+1,m+2\}$, so $L(t)$ is in $L$.

. . . continue repeating until time $t=T+p$

This completes the proof of Case I.A.

Case I.B: If $B(T)$ is empty, then an even more simplified version the rationale of the proof of Case I.A applies and the result follows immediately.

Case II: If $p=zKC+kC+r$, where $k<K$ and $r<C$, rewrite $p=zKC+p'$ where $p'=kC+r$. Note that at time $T+zKC$ the load state will be exactly the same as at T, no matter which queue we start from. Hence, the proof is essentially delegated to Case I, with p' playing the role of p in that case.

Based on the above we see that the backlog in any of the processor queues does not exceed 2C under the load balancing/round robin cell distribution method. Hence, with a queue size of 2C bits on every processor, the load balancing/round robin cell distribution method does not cause a packet to be dropped under normal operation of the system.

From the above discussion, it is clear that for packet sizes that are smaller than C bits, the PQ and CCQ queuing architectures operate quite similarly. However, CCQ provides significant benefits compared with PQ when packet sizes are larger than C bits. To see why CCQ provides benefits over PQ, consider the limiting case where C=1, that is, each packet is divided into cells of size one bit, and each bit is sequentially distributed among the processors. If the processors operate at a rate of R/K, it is clear that the queue buffers required for each processor are at most one bit. However, in the PQ case, the minimum buffer size required is the number of bits in a maximum sized packet. By varying the cell size C between its two extremes of C=1 and C equal to the maximum packet size, the size of the input buffer is flexible in a CCQ architecture.

Another important consideration in parallel packet processing architectures for networking equipment is the maintenance of packet ordering. This is another aspect in which CCQ provides benefits compared with PQ. Consider again the limiting case where C=1, and each packet is divided into its constituent bits, which are transmitted sequentially (in CCQ fashion) to all the processors. Once again, by choosing C between these values, an intermediate amount of post processing buffering can be used.

However, the CCQ architecture has significant advantages over the CSQ one, because of the following reason. However, with the sequential cell queueing of the CCQ architecture, if a choice is made for the processor queue used for the first cell of the packet, and the following cells are placed in consecutive processors (modulo K) or in a variant, in processors according to a predetermined order, then the only information that needs to be communicated to the packet assembler to properly collect the packet, is simply the start (head) processor queue where the first cell of the packet is enqueued.

Therefore, a strategy of dividing a packet into cells, and placing the cells of a particular packet in a predetermined order of queues from a start or first queue with freedom to choose the start processor queue provides benefits in terms of the following: pre-processing buffering, post-processing buffering, and the information required for packet reassembly.

Various embodiments of the present invention have been described above. It should be understood that these embodiments have been presented by way of example only, and not limitation. It will be understood by those of ordinary skill in the relevant art that various changes in form and the details of the embodiments described above may be made without departing from the spirit and scope of the present invention.

The invention claimed is:

1. In a parallel packet processing system, a method for placing cells of a packet in processor queues according to a predetermined order comprising:
    selecting a first processor queue for a first cell of the packet, comprising:
        determining a maximum integer number of cells in a load period, the maximum integer number of cells having a number of bits for the load period less than a bit load state of each processor queue for the load period,
        determining a difference between the number of bits for the load period and the bit load state for each processor queue for the load period, and
        responsive to at least one difference being greater than a cell size of bits, selecting as the first queue for the first cell a queue satisfying criteria including having a difference less than the cell size and being the next queue according to the predetermined order after a previous queue in the predetermined order having a difference greater than or equal to the cell size; and
    enqueueing each nth cell in a processor queue in accordance with a predetermined order beginning with the first processor queue.

2. The method of claim 1 further comprising
    responsive to each of the differences being less than a cell size of bits, selecting one of the queues as the first queue according to a desired criteria.

3. The method of claim 1 wherein the criteria further includes having a minimum index of the queues according to ((index) modulo (a number of processor queues in the system)).

4. The method of claim 1 further comprising:
    receiving data indicating the first queue;
    retrieving the cells in accordance with the predetermined order; and
    assembling the cells of the packet into packet form.

5. In a parallel packet processing system, a method for placing cells of a packet in processor queues according to a predetermined order comprising:
    selecting a first processor queue for a first cell of the packet; and
    enqueueing each nth cell in a processor queue in accordance with a predetermined order beginning with the first processor queue, comprising:
        placing the nth cell in the queue having an index of ((the index of the first processor queue+n) modulo (the number of processor queues in the system)).

6. A parallel packet processing system for placing cells of a packet in processor queues according to a predetermined order comprising:
    a plurality of processor queues;
    a cell scheduler for selecting a first processor queue for a first cell of the packet, the cell scheduler being in communication with a cell switch, the cell scheduler comprising:

logic for selecting the first processor queue for the first cell of the packet including logic for determining a maximum integer number of cells in a load period, the maximum integer number of cells having a number of bits for the load period less than a bit load state of each processor queue for the load period, logic for determining a difference between the number of bits for the load period and the bit load state for each processor queue for the load period, and logic for, responsive to at least one difference being greater than a cell size of bits, selecting as the first queue for the first cell a queue satisfying criteria including having a difference less than the cell size and being the next queue according to the predetermined order after a previous queue in the predetermined order having a difference greater than or equal to the cell size; and the cell switch having access to the plurality of processor queues and the cell switch receiving instructions from the cell scheduler for enqueueing each nth cell in a processor queue in accordance with a predetermined order beginning with the first processor queue.

7. The system of claim 6 wherein the criteria further includes having a minimum index of the queues according to ((index) modulo (a number of processor queues in the system)).

8. The system of claim 6 further comprising a cell assembly manager being communicatively coupled with the cell scheduler for receiving data indicating the first queue; and the cell assembly manager retrieving the cells in accordance with the predetermined order.

9. A parallel packet processing system for placing cells of a packet in processor queues according to a predetermined order comprising:

a plurality of processor queues;

a cell scheduler for selecting a first processor queue for a first cell of the packet, the cell scheduler being in communication with a cell switch;

the cell switch having access to the plurality of processor queues, and the cell switch receiving instructions from the cell scheduler for enqueueing each nth cell in a processor queue in accordance with a predetermined order beginning with the first processor queue;

logic for determining a difference between a number of bits for a load period and a bit load state for each processor queue for the load period; and logic for, responsive to each of the differences being less than a cell size of bits, selecting one of the queues as the first queue according to a desired criteria.

10. A parallel packet processing system for placing cells of a packet in processor queues according to a predetermined order comprising:

a plurality of processor queues;

a cell scheduler for selecting a first processor queue for a first cell of the packet, the cell scheduler being in communication with a cell switch; and the cell switch having access to the plurality of processor queues and the cell switch receiving instructions from the cell scheduler for enqueueing each nth cell in a processor queue in accordance with a predetermined order beginning with the first processor queue comprising:

placing the nth cell in the queue having an index of ((the index of the first processor queue+n) modulo (the number of processor queues in the system)).

11. A system for placing cells of a packet in processor queues according to a predetermined order in a parallel packet processing system comprising:

means for selecting a first processor queue for a first cell of the packet comprising:

means for determining a maximum integer number of cells in a load period, the maximum integer number of cells having a number of bits for the load period less than a bit load state of each processor queue for the load period, means for determining a difference between the number of bits for the load period and the bit load state for each processor queue for the load period, and means for, responsive to at least one difference being greater than a cell size of bits, selecting as the first queue for the first cell a queue satisfying criteria including having a difference less than the cell size and being the next queue according to the predetermined order after a previous queue in the predetermined order having a difference greater than or equal to the cell size; and means for enqueueing each nth cell in a processor queue in accordance with a predetermined order beginning with the first processor queue.

12. The system of claim 11 further comprising:

means for, responsive to each of the differences being less than a cell size of bits, selecting one of the queues as the first queue according to a desired criteria.

13. The system of claim 11 wherein the criteria further includes having a minimum index of the queues according to ((index) modulo (a number of processor queues in the system)).

14. A system for placing cells of a packet in processor queues according to a predetermined order in a parallel packet processing system comprising:

means for selecting a first processor queue for a first cell of the packet; and means for enqueueing each nth cell in a processor queue in accordance with a predetermined order beginning with the first processor queue, comprising:

means for placing the nth cell in the queue having an index of ((the index of the first processor queue+n) modulo (the number of processor queues in the system)).

15. The system of claim 11 further comprising:

means for receiving data indicating the first queue;

means for retrieving the cells in accordance with the predetermined order; and means for assembling the cells of the packet into packet form.

16. A computer readable medium comprising instructions embodied thereon, which when executed by a processor cause the processor to perform a method for placing cells of a packet in processor queues according to a predetermined order in a parallel packet processing system, the method comprising:

selecting a first processor queue for a first cell of the packet, comprising:

determining a maximum integer number of cells in a load period, the maximum integer number of cells having a number of bits for the load period less than a bit load state of each processor queue for the load period;

determining a difference between the number of bits for the load period and the bit load state for each processor queue for the load period; and responsive to at least one difference being greater than a cell size of bits, selecting as the first queue for the first cell a queue satisfying criteria including having a difference less than the cell size and being the next queue according to the predetermined order after a previous queue in the predetermined order having a difference greater than or equal to the cell size; and enqueueing each nth cell in a processor queue in accordance with a predetermined order beginning with the first processor queue.

17. The computer readable medium of claim 16 further comprising instructions which when executed by a processor cause the processor to perform:

responsive to each of the differences being less than a cell size of bits, selecting one of the queues as the first queue according to a desired criteria.

18. The computer readable medium of claim 16 wherein the criteria further includes having a minimum index of the queues according to ((index) modulo (a number of processor queues in the system)).

19. The computer readable medium of claim 16 further comprising instructions which when executed by a processor cause the processor to perform:

receiving data indicating the first queue;

retrieving the cells in accordance with the predetermined order; and assembling the cells of the packet into packet form.

20. A computer readable medium comprising instructions embodied thereon, which when executed by a processor cause the processor to perform a method for placing cells of a packet in processor queues according to a predetermined order in a parallel packet processing system, the method comprising:

selecting a first processor queue for a first cell of the packet; and enqueueing each nth cell in a processor queue in accordance with a predetermined order beginning with the first processor queue, comprising:

placing the nth cell in the queue having an index of ((the index of the first processor queue+n) modulo (the number of processor queues in the system)).

* * * * *